(12) United States Patent
Kim et al.

(10) Patent No.: US 8,773,602 B2
(45) Date of Patent: Jul. 8, 2014

(54) STEREOSCOPIC IMAGE DISPLAY

(75) Inventors: Seok Kim, Seoul (KR); Kwangjo Hwang, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 39 days.

(21) Appl. No.: 13/531,214

(22) Filed: Jun. 22, 2012

(65) Prior Publication Data

US 2013/0106839 A1    May 2, 2013

(30) Foreign Application Priority Data

Oct. 26, 2011   (KR) .................. 10-2011-0109795

(51) Int. Cl.
*G02F 1/1335* (2006.01)
(52) U.S. Cl.
USPC ........................................................... 349/15
(58) Field of Classification Search
None
See application file for complete search history.

(56) References Cited

U.S. PATENT DOCUMENTS

| 2002/0163602 A1* | 11/2002 | Lee ................................. 349/43 |
| 2010/0265230 A1 | 10/2010 | Kang |
| 2011/0227886 A1* | 9/2011 | Lee et al. ...................... 345/204 |

FOREIGN PATENT DOCUMENTS

| JP | 2002-185983 A | 6/2002 |
| KR | 10-2005-0066642 A | 6/2005 |
| KR | 10-2010-0115036 A | 10/2010 |
| KR | 10-2011-0104861 A | 9/2011 |

\* cited by examiner

*Primary Examiner* — Thanh-Nhan P Nguyen
(74) *Attorney, Agent, or Firm* — Birch, Stewart, Kolasch & Birch, LLP

(57) ABSTRACT

A stereoscopic image display according to an embodiment includes: a main display section including a first liquid crystal cell connected to a data line through a first switch TFT and connected to a common line supplied with a common voltage and a first storage capacitor; and an auxiliary display section including a second liquid crystal cell connected to the data line through a second switch TFT and connected to the common line through a discharge control TFT and a second storage capacitor.

14 Claims, 8 Drawing Sheets

STEREOSCOPIC IMAGE DISPLAY

This application claims the priority benefit of Korean Patent Application No. 10-2011-0109795 filed on Oct. 26, 2011 in Republic of Korea, the entire contents of which are incorporated herein by reference for all purposes as if fully set forth herein.

BACKGROUND

1. Field

This document relates to a stereoscopic image display

2. Related Art

Methods of implementing 3D images of a stereoscopic image display may be classified into a stereoscopic technique and an autostereoscopic technique.

The stereoscopic technique is implemented using a time difference image of left and right eyes having the most reliable three dimensional effects. The stereoscopic technique is classified into a glasses method and a non-glasses method. The non-glasses method is a method in which, generally, an optical plate, such as a parallax barrier, for separating the optical axes of left and right parallax images is installed in front or rear of a display screen. The glasses method displays left and right parallax images with different polarization directions on a display panel, and implements a stereoscopic image using polarization glasses or liquid-crystal shutter glasses.

The liquid crystal shutter glasses type implements 3D images by alternately displaying a left eye image and a right image on a display device by the frame unit, and opening and closing the left and right eye shutters of the liquid crystal shutter glasses in synchronization with the left/right eye image data. In the liquid-crystal shutter glasses type, the data on time of the liquid-crystal shutter glasses is short. Thus, the luminance of the 3D images is low, and serious 3D crosstalk may occur depending on the synchronization between the display device and the liquid-crystal shutter glasses and the on/off switching response characteristic.

In the polarization glasses type, a polarization separation device such as a pattern retarder is attached to a display panel. The pattern retarder separates the polarization of a left-eye image and a right-eye image displayed on the display panel. By wearing polarization glasses, a viewer sees the polarization of the left-eye image through the left-eye filter of the polarization glasses and the polarization of the right-eye image through the left-eye filter of the polarization glasses when watching a stereoscopic image, and hence feels the stereoscopic effect.

In a conventional stereoscopic image display of the polarization glasses type, a liquid crystal display panel may be used as a display panel. This stereoscopic image display provides a narrow vertical viewing angle due to the parallax between a pixel array of the liquid crystal display panel and a pattern retarder caused by the thickness of an upper glass substrate of the liquid crystal display panel and the thickness of an upper polarization plate. When viewing a stereoscopic image displayed on the stereoscopic image display of the polarization glasses type at a vertical viewing angle greater or smaller than the front surface of the liquid crystal display panel, the viewer feels a 3D crosstalk in which the viewer sees an overlapping image of left-eye and right-eye images when viewing with one eye (the left eye or the right eye).

In order to solve the 3D crosstalk problem of a vertical viewing angle in the stereoscopic image display of the polarization glasses type, Japanese Laid Open Publication No. 2002-185983 proposed a method for forming black stripes (or 3D film) on a patterned retarder of the stereoscopic image display. In another method, the width of a black matrix formed on a liquid crystal display panel can be increased. However, the black stripes formed on the patterned retarder may lower the luminance of 2D/3D images, and they may interact with the black matrixes, causing moiré. A method of increasing the width of a black matrix reduces aperture ratio, thus lowering the luminance of 2D/3D images.

To solve the problems of the stereoscopic image display disclosed in Japanese Laid Open Publication No. 2002-185983, the present applicant proposed a technique for dividing each of the pixels of a display panel into two and using any one of them as an active black stripe through Korean Patent Application No. 2009-0033534 (filed on Apr. 17, 2009), U.S. patent application Ser. No. 12/536,031 (filed on Aug. 5, 2009), etc. The stereoscopic image display proposed by the present applicant can prevent a decrease in the luminance of 2D images by dividing each pixel into two: a main display section and an active black stripe and writing 2D image data in the main display section and the active black stripe in the 2D mode. Also, the stereoscopic image display proposed by the present applicant can obtain a black stripe effect in the 3D mode by writing 3D image data in the main display section and black gray scale data in the active black stripe in the 3D mode, thereby widening the vertical viewing angle. Meanwhile, when implementing the stereoscopic image display proposed by the present applicant, an increase in the number of TFTs (thin film transistors) in the main display section and the active black stripe may increase the gate-drain parasitic capacitance Cgd and vary the gate-source parasitic capacitance Cgs of the main display section and the active black matrix. An increase in the gate-drain parasitic capacitance Cgd may result in a large RC (resistance and capacitance) delay of a pixel, thus deteriorating the data charging characteristics of the pixel. Also, a variation in the Cgs value between the main display section and the active black stripe causes a variation in kickback voltage $\Delta Vp$, thereby generating a luminance difference between them. The capacitance of a storage capacitor may be increased in order to design the main display section and the active black strip to have $\Delta Vp$ at equal levels. However, this may reduce the aperture ratio of a pixel.

SUMMARY

An aspect of this document is to provide a stereoscopic image display capable of improving data charging characteristics and minimizing decrease in aperture ratio, which can increase the luminance of a display image in a 2D mode and widen the vertical viewing angle in a 3D mode by dividing each pixel into a main display section and an active black stripe.

The stereoscopic image display according to this document comprises: a main display section comprising a first liquid crystal cell connected to a data line through a first switch TFT and connected to a common line supplied with a common voltage and a first storage capacitor; and an auxiliary display section comprising a second liquid crystal cell connected to the data line through a second switch TFT and connected to the common line through a discharge control TFT and a second storage capacitor.

The main display section and the auxiliary display section are separated within a pixel, with a gate line crossing the data line interposed therebetween.

A source electrode of the second switch TFT is connected to a link pattern through a first contact hole passing through a passivation film.

The link pattern is commonly connected to a source electrode of the discharge control TFT and a pixel electrode of the second liquid crystal cell through a second contact hole passing through the passivation film.

The link pattern and the pixel electrode of the second liquid crystal cell are in a transparent electrode pattern formed on the passivation film covering the TFTs.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
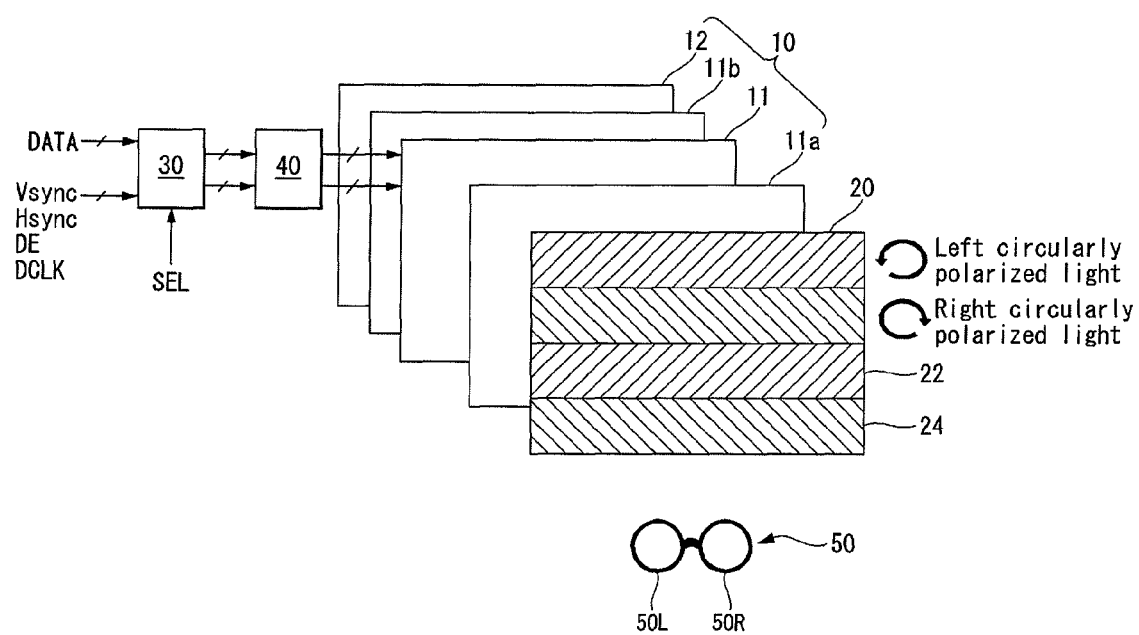
FIGS. 1 and 2 are block diagrams showing a polarization glasses type stereoscopic image display according to an exemplary embodiment of the present invention.
Figure 2:
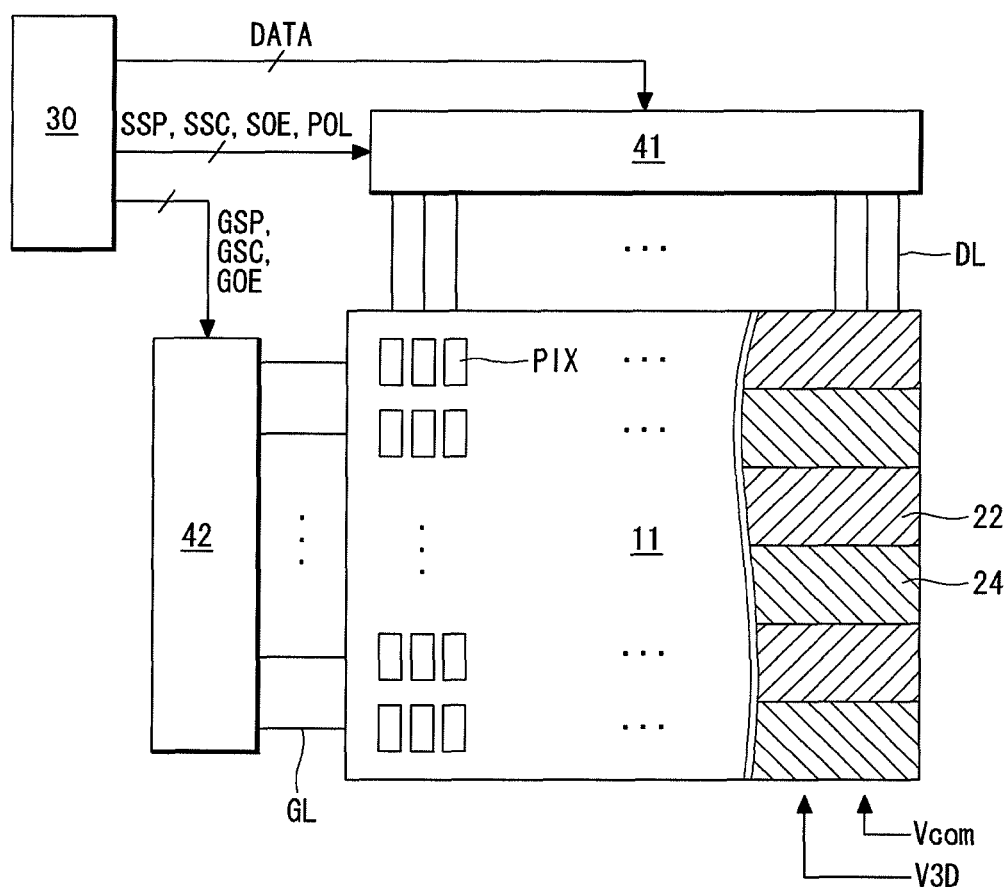

Hereinafter, implementations of this document will be described in detail with reference to the attached drawings. The same reference numerals will be used throughout to designate the same or like components. In describing the present invention, if a detailed explanation for a related known function or construction is considered to unnecessarily divert the gist of the present invention, such explanation will be omitted.

FIGS. 1 to 5 are views showing the structure and operating principle of a stereoscopic image display according to an exemplary embodiment of the present invention.

With reference to FIGS. 1 to 5, the stereoscopic image display of the present invention comprises a display device 10, a pattern retarder 20, a controller 30, a panel driving circuit 40, and polarization glasses 50.

The display device 10 may be implemented as a flat panel display device such as liquid crystal display (LCD), field emission display (FED), plasma display panel (PDP), electroluminescence device (EL) including an inorganic electroluminescence and organic light emitting diode (OLED), electrophoresis (EPD), and the like. Hereinafter, it is to be noted that the display device 10 will be described with respect to a liquid crystal display but is not limited thereto.

The display device 11 comprises a display panel 11, an upper polarizer film 11a, and a lower polarizer film 11b. The display panel 11 displays a 2D image in a 2D mode and a 3D image in a 3D mode. The display panel 11 may comprise two glass substrates and a liquid crystal layer formed between them. Formed on the lower glass substrate of the display panel 11 is a pixel array comprising data lines DL, gate lines GL crossing the data lines DL, a common line VCL1 and VCL2 for supplying a common voltage Vcom, a discharge control line V3DL for supplying a discharge control voltage V3D, TFTs ST1, ST2, and DST, a main display section MP, and an auxiliary display section SP. The main display section MP and the auxiliary display section SP are separated within a pixel PIX, with the gate line GL interposed therebetween.

The first common line VCL1 is in parallel with the gate line GL, and the second common line VCL2 is in parallel with the data line DL. The common line VCL1 and VCL2 is divided into the first and second common lines VCL1 and VCL2. The first and second common lines VCL1 and VCL2 are electrically connected to each other to supply a common voltage Vcom to common electrodes Ec1 and Ec2 within the pixel PIX.

Formed on the upper glass substrate of the display panel 11 is a color filter array comprising black matrices, color filters, etc. A common electrode to which the common voltage Vcom is supplied may be further formed on the upper glass substrate. The upper and lower polarizer films 11a and 11b are respectively attached to the upper and lower glass substrates of the display panel 11, and an alignment film for setting a pre-tilt angle of liquid crystal is formed. Columnar spacers may be formed between the glass substrates in order to maintain a cell gap of the liquid crystal cells.

The display panel 11 may be implemented in any form of a transmissive display device, a semi-transmissive display device, a reflective display device, and the like. The transmissive display device and the semi-transmissive display device need a backlight unit 12. The backlight unit 12 may be implemented as a direct type backlight unit or an edge type backlight unit.

Figure 3:
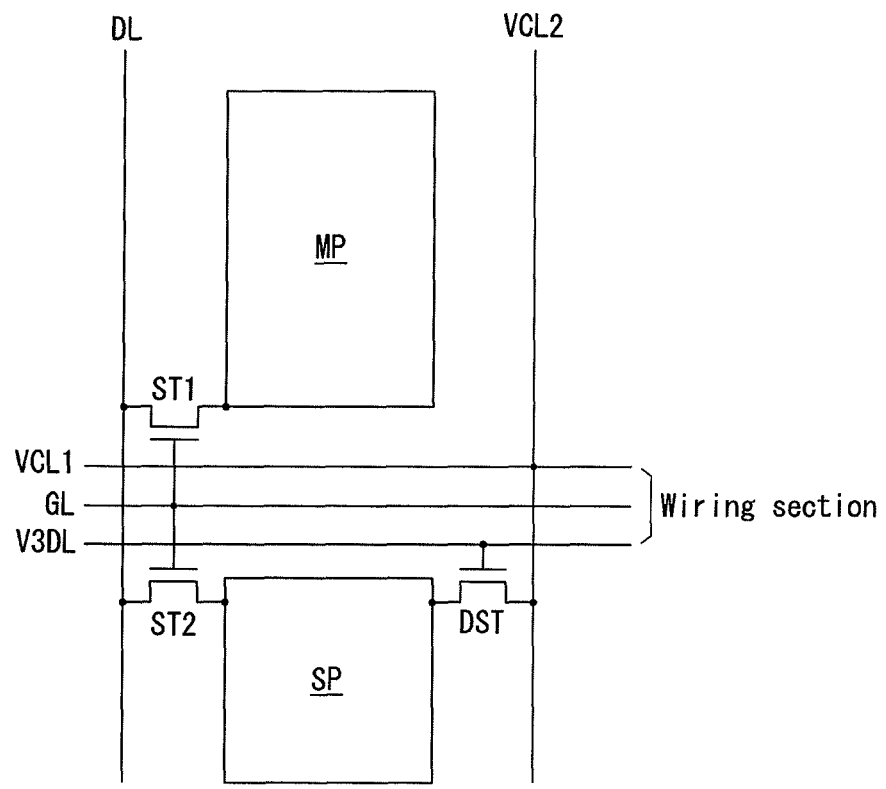
FIG. 3 is an equivalent circuit diagram of the pixel shown in FIG. 2.

The pixel array of the display panel 11 comprises pixels PIX disposed in a matrix form according to a crossing structure of the signal lines DL and GL. Each of the pixels PIX may be any one of three subpixels of three primary colors of red (R), green (G), and blue (B). Moreover, as shown in FIG. 3, each of the pixels PIX comprises a main display section MP and an auxiliary display section SP functioning as an active black stripe, which are divided with a wiring section interposed therebetween. The wiring section between the main display section MP and the auxiliary display section SP comprises the first common line VCL1, the gate line GL, and the discharge control line V3DL.

The main display section MP is connected to the data line DL through a first switch TFT ST1, and connected to the first common line VCL1. The auxiliary display section SP is connected to the data line DL through a second switch TFT ST2, and connected to the second common line VCL2 through a discharge control TFT DST. The first switch TFT ST1 and the second switch TFT ST2 are simultaneously switched on by a scan pulse (SCAN of FIG. 4) from the gate line GL. The scan pulse SCAN is swung between a gate low voltage VGL and a gate high voltage VGH. The discharge control TFT DST is switched on by a discharge control voltage V3D supplied from the discharge control line V3DL.

Figure 4:
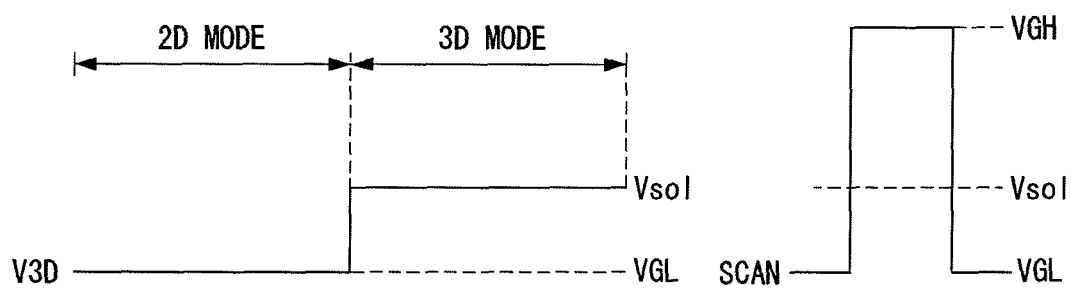
FIG. 4 is a waveform diagram showing a discharge control voltage according to driving modes.

As shown in FIG. 4, the discharge control voltage V3D is generated at different values according to a mode selection signal SEL. In the 2D mode, the discharge control voltage V3D may be generated at the same level as the gate low voltage VGL so as to turn off the discharge control TFT DST. In the 3D mode, the discharge control voltage V3D may be generated at a slight-on level voltage Vsol higher than the gate low voltage VGL and lower than the gate high voltage VGH so as to slight turn-on the discharge control TFT DST. The 'slight-on' state represents a state in which the channel current Ids of a TFT is small compared to the 'full-on' state. This is because the channel resistance and channel current of the TFT is dependent upon gate voltage. The gate low voltage VGL may be set to a voltage between −5 V and 0 V, and the gate high voltage VGH may be set to a voltage between 25 V and 30 V. In this case, the slight-on level voltage Vsol may be set to a voltage between 8 V and 12 V.

The discharge control TFT DST may be deteriorated due to gate bias stress when the gate voltage is applied for a long period of time as a direct current voltage. In this case, the threshold voltage of the TFT is changed. To reduce the deterioration of the discharge control TFT DST caused by gate bias stress, the discharge control voltage V3D may be lowered periodically to the gate low voltage VGL in the 3D mode.

Figure 5:
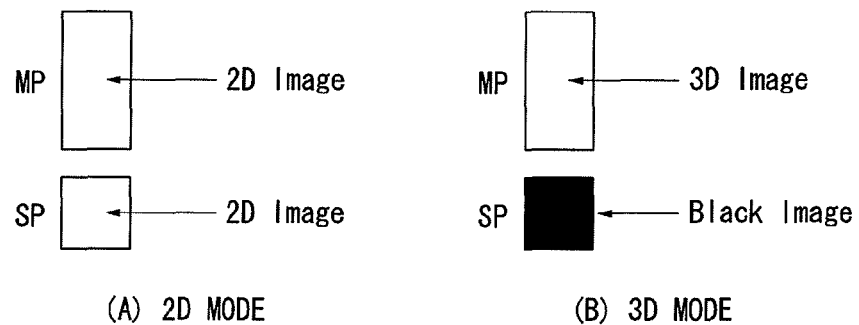
FIG. 5 is a view showing an operation example of a pixel in a 2D mode and a 3D mode.

As shown in FIG. 5, the main display section MP displays 2D image data in the 2D mode, and displays 3D image data in the 3D mode. In contrast, as shown in FIG. 5, the auxiliary display section SP displays 2D image data in the 2D mode, whereas it displays a black grayscale in the 3D mode and acts as a black stripe.

The patterned retarder 20 is attached to the upper polarizer film 11a of the display panel 11. A first polarization selection pattern 22 is formed at the odd-numbered lines of the patterned retarder 20. A second polarization selection pattern 24 is formed at the even-numbered lines of the patterned retarder 20. A light absorption axis of the first polarization selection pattern 22 is orthogonal to a light absorption axis of the second polarization selection pattern 24. The first polarization selection pattern 22 faces the odd-numbered horizontal pixel lines of the pixel array, and the second polarization selection pattern 24 faces the even-numbered horizontal pixel lines of the pixel array. The first polarization selection pattern 22 delays the light incident from the upper polarizer film 11a to allow first polarized light (e.g., left circularly polarized light) to pass therethrough. The second polarization selection pattern 24 delays the light incident from the upper polarizer film 11a to allow second polarized light (e.g., right circularly polarized light) to pass therethrough. The optical axes of the first and second polarized lights are orthogonal to each other.

The controller 30 controls the operation of the panel driving circuit 40 in the 2D mode or 3D mode according to a mode selection signal SEL. The controller 30 receives a mode selection signal SEL via a user interface such as a touch screen, an on screen display (OSD), a keyboard, a mouse, a remote controller, and the like, and switches between a 2D mode operation and a 3D mode operation in response to the mode selection signal SEL. Meanwhile, the controller 30 may differentiate the 2D mode from the 3D mode by detecting 2D/3D identification code encoded in data for an input image, for example, a 2D/3D identification code which can be coded into an EPG (Electronic Program Guide) or ESG (Electronic Service Guide) of a digital broadcasting standard.

The controller 30 separates 3D image data input from a video source under the 3D mode into left-eye image data and right-eye image data, and then supplies the left-eye image data and the right-eye image data to a data driver 41. To this end, the controller 30 may comprise a 3D formatter. The controller 30 supplies RGB data of a 2D image input from a video source under the 2D mode to the data driver 41.

The controller 30 generates control signals for controlling an operation timing of the panel driving circuit 40 by using timing signals such as a vertical synchronization signal Vsync, a horizontal synchronization signal Hsync, a data enable signal DE, a dot clock CLK, and the like.

Data control signals for controlling an operation timing of the data driver 41 comprise a source start pulse SSP indicating a start point of data in 1 horizontal period when data for 1 horizontal line is displayed, a source sampling clock SSC controlling a sampling timing of data, a source output enable signal SOE controlling an output timing of the data driver 41, and a polarity control signal POL controlling the polarity of a data voltage to be supplied to liquid crystal cells of the display panel 11.

Gate control signals for controlling an operation timing of the gate driver 42 comprise a gate start pulse GSP indicating a start horizontal line from which scanning begins in 1 vertical period when one screen is displayed, a gate shift clock signal GSC input into a shift register within the gate driver 42 to sequentially shift a gate start pulse GSP, and a gate output enable signal GOE controlling an output of the gate driver 42.

The controller 30 can control the operation of the panel driving circuit 40 at a frame frequency of N×f (where N is a positive integer more than 2, and f is an input frame frequency by multiplying timing signals Vsync, Hsync, DE, and DCLK which are synchronized with an input frame frequency. The input frame frequency is 60 Hz in the NTSC (National Television Standard Committee) system and 50 Hz in the PAL (Phase-Alternating Line) system.

The panel driving circuit 40 comprises the data driver 41 for driving the data lines DL of the display panel 11 and the gate driver 42 for driving the gate lines GL of the display panel 11.

The data driver 41 latches digital video data of a 2D or 3D image under the control of the timing controller 30, and converts the digital video data into analog positive gamma compensation voltages and analog negative gamma compensation voltages. The data driver 41 inverts the polarities of data voltages to be supplied to the data lines DL in response to a polarity control signal POL. The data driver 41 outputs the data voltages to the data lines DL in synchronization with scan pulses (or gate pulses) output from the gate driver 42.

The gate driver 42 sequentially supplies scan pulses SCAN swung between the gate high voltage VGL and the gate low voltage VGL to the gate lines GL under the control of the controller 30.

The panel driving circuit 40 comprises a power circuit (not shown), a discharge control voltage generation circuit, etc. The power circuit generates panel driving voltages, such as the common voltage Vcom, the gate high voltage VGH, the gate low voltage VGL, positive/negative gamma reference voltages, and the slight-on level voltage Vsol, to be supplied to the display panel 11. The power circuit may be implemented as a DC-DC converter. The discharge control voltage generation circuit outputs the same discharge control voltage V3D as shown in FIG. 4 under the control of the controller 30. The discharge control voltage generation circuit may be implemented as a power switching device for switching the slight-on level voltage Vsol and the gate low voltage VGL.

The polarization glasses 50 comprises a left-eye 50L having a left-eye polarization filter and a right-eye 50R having a right-eye polarization filter. The left-eye polarization filter has the same light absorption axis as the first polarization selection pattern 22 of the pattern retarder 20, and the right-eye polarization filter has the same light absorption axis as the second polarization selection pattern 24 of the pattern retarder 20. For example, a left circularly polarized filter may be selected as the left-eye polarization filter of the polarization glasses 50, and a right circularly polarized filter may be selected as the right-eye polarization filter of the polarization glasses 50. By wearing the polarization glasses 50, the viewer sees only left eye images with the left eye and only right eye images with the right eye. As a result, the viewer can feel a stereoscopic effect through binocular parallax.

Figure 6:
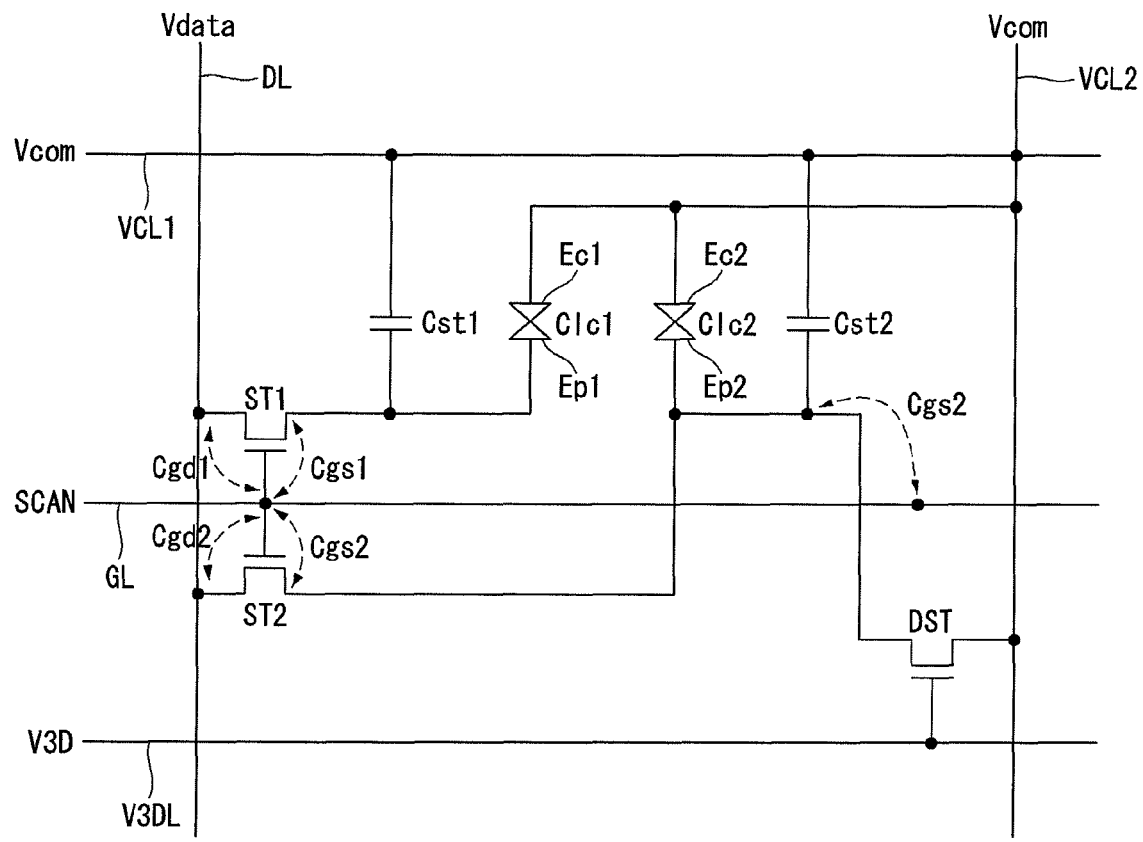
FIG. 6 is an equivalent circuit diagram of a pixel PIX showing a detailed configuration of the main display section and auxiliary display section shown in FIG. 3.
Figure 7:
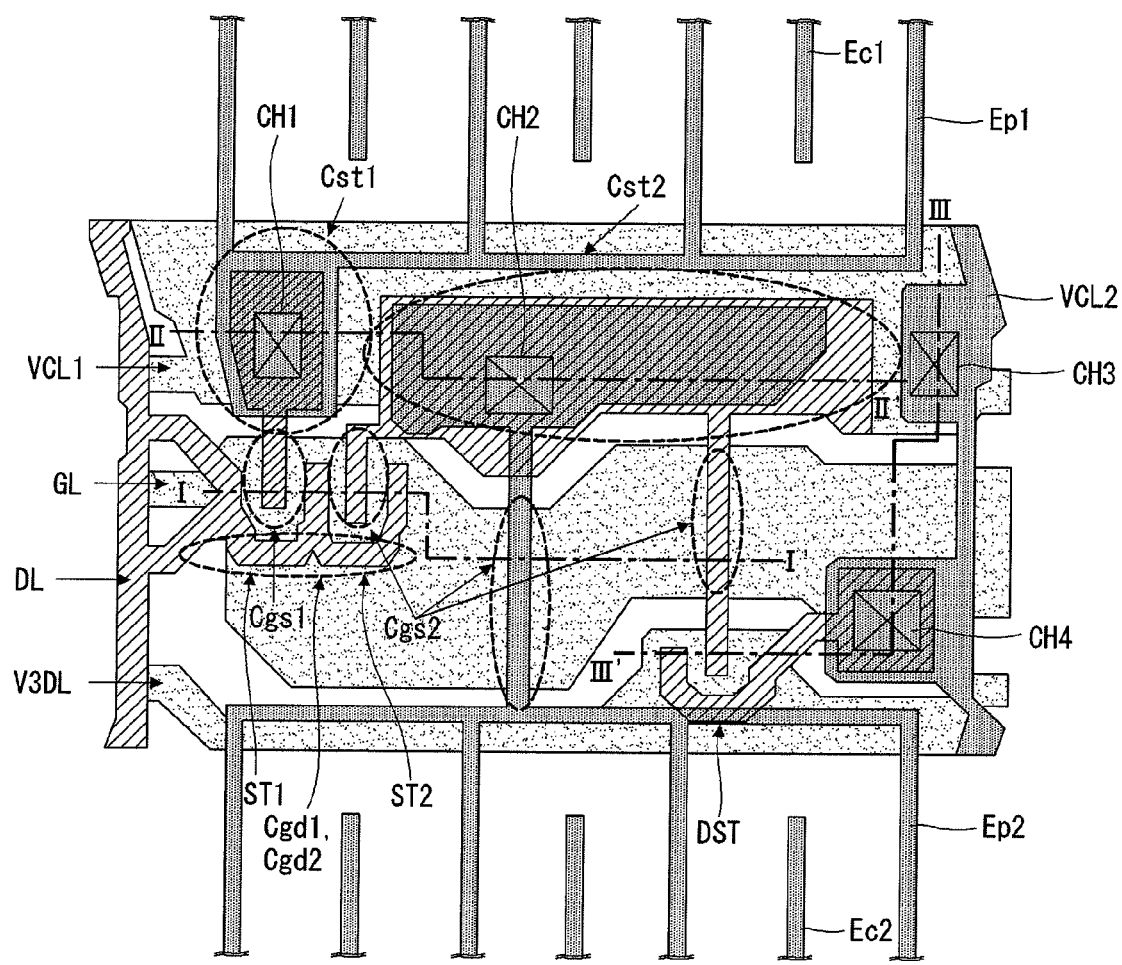
FIG. 7 is a top plan view showing an implementation of the pixel PIX.
Figure 8A:
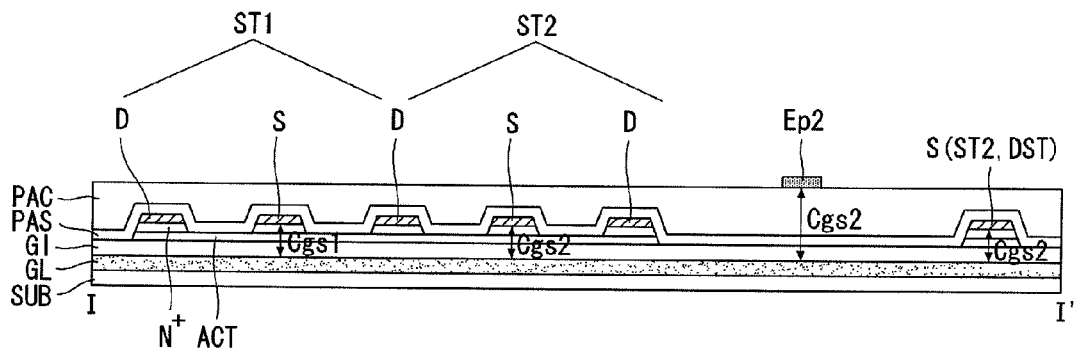
FIG. 8A is a cross-sectional view taken along line I-I' of FIG. 7.
Figure 8B:
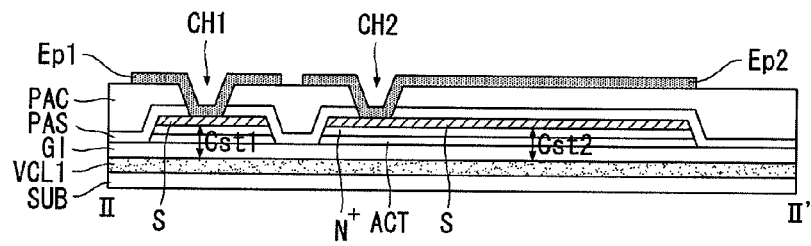
FIG. 8B is a cross-sectional view taken along line II-II' of FIG. 7.
Figure 8C:
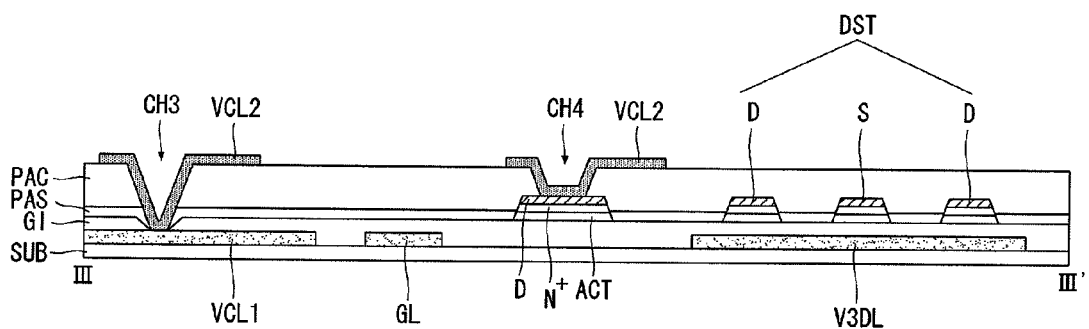
FIG. 8C is a cross-sectional view taken along line of FIG. 7.

FIG. 6 is an equivalent circuit diagram of a pixel PIX. FIG. 7 is a top plan view showing an implementation of the pixel PIX. FIGS. 8A to 8C are cross-sectional views taken along line I-I', line II-II', and line III-III' of FIG. 7. In FIGS. 8A to 8C, 'ACT' represents a semiconductor active layer for forming a channel between the source electrode and drain electrode of a TFT, 'N+' represents a semiconductor ohmic contact layer for making an ohmic contact with the source electrode and drain electrode of the TFT, and 'SUB' represents the lower glass substrate.

With reference to FIGS. 6 to 8C, the main display section MP comprises a first liquid crystal cell Clc1 connected to a first switch TFT ST1 and supplied with a common voltage Vcom and a first storage capacitor Cst1. Liquid crystal molecules of the first liquid crystal cell Clc1 are driven by a voltage difference between a first pixel electrode Ep1 supplied with a data voltage and a first common electrode Ec1 supplied with the common voltage Vcom. The first pixel electrode Ep1 is connected to the data line DL through the first switch TFT ST1. The first common electrode Ec1 is connected to any one of the first and second common lines VCL1 and VCL2 and supplied with the common voltage Vcom. The first storage capacitor Cst1 keeps the voltage of the first liquid crystal cell clc1 constant.

The first switch TFT ST1 is turned on in response to a scan pulse SCAN from the gate line GL to apply a data voltage Vdata from the data line DL to the first pixel electrode Ep1. A gate electrode of the first switch TFT ST1 is connected to the gate line GL, and a drain electrode D thereof is connected to the data line DL. A source electrode S of the first switch TFT ST1 is connected to the first pixel electrode Ep1 through a first contact hole CH1 passing through an organic insulation film PAC and an inorganic insulation film PAS.

The first storage capacitor Cst1 comprises the source electrode S of the first switch TFT ST1 and the first common line VCL1 overlapping with the source electrode S of the first switch TFT ST1 with a dielectric layer interposed therebetween. The dielectric layer of the first storage capacitor Cst1 comprises a gate insulation film GI and a semiconductor pattern ACT and N+ which are sequentially laminated. The semiconductor pattern ACT and N+ comprises a semiconductor active layer ACT and a semiconductor ohmic contact layer N+ formed thereon.

The first common electrode Ec1 is connected to the second common line VCL2 supplied with the common voltage Vcom. The second common line VCL2 is connected to the first common line VCL1 through a third contact hole CH3 passing through the organic insulation film PAC, the inorganic insulation film PAS, and a gate insulation film GI. Accordingly, the first and second common lines VCL1 and VCL2 are supplied with the common voltage Vcom.

The auxiliary display section SP comprises a second liquid crystal cell Clc2 connected to the second switch TFT ST2 and the discharge control TFT DST and supplied with a common voltage Vcom and a second storage capacitor Cst2. Liquid crystal molecules of the second liquid crystal cell Clc2 are driven by a voltage difference between a second pixel electrode Ep2 supplied with a data voltage and a second common electrode Ec2 supplied with the common voltage Vcom. The second pixel electrode Ep2 is connected to the data line DL through the second switch TFT ST2. The second common electrode Ec2 is connected to any one of the first and second common lines VCL1 and VCL2 and supplied with the common voltage Vcom. The second storage capacitor Cst2 keeps the voltage of the second liquid crystal cell clc2 constant.

The second switch TFT ST2 is turned on in response to a scan pulse SCAN from the gate line GL to apply a data voltage Vdata from the data line DL to the second pixel electrode Ep2. A gate electrode of the second switch TFT ST2 is connected to the gate line GL, and a drain electrode D thereof is connected to the data line DL. A source electrode S of the second switch TFT ST2 is connected to the second pixel electrode Ep2 through a second contact hole CH2 passing through the organic insulation film PAC and the inorganic insulation film PAS. To this end, one end of the second pixel electrode Ep2 extends across the gate line GL with the organic insulation film PAC and the inorganic insulation film PAS interposed therebetween and is connected to the source electrode S of the second switch TFT ST2 through the second contact hole CH2. The source electrode S of the second switch TFT ST2 is connected to the storage capacitor Cst2 through the pixel electrode Ep2 and the second contact hole CH2, and directly connected to the source electrode S of the discharge control TFT DST.

The gate electrodes of the first and second switch TFTs ST1 and ST2 are implemented as part of the gate line GL in order to reduce a decrease in the aperture ratio of the pixel PIX. The source and drain electrodes S and D of the first and second switch TFTs ST1 and ST2 overlap with the gate line GL with the semiconductor pattern ACT and N+ interposed therebetween.

The drain electrodes of the first and second switch TFTs ST1 and ST2 are integrally formed in a 'W'-shaped source/drain metal pattern in which two U shapes are connected in parallel. The first and second switch TFTs ST1 and ST2 are right next to each other. The drain electrode D of the discharge control TFT DST is patterned in 'U' shape. One end of the source electrode S of each of the TFTs ST1, ST2, and DsT is positioned within the U-shaped channel defined by the U-shaped drain electrode D.

The second storage capacitor Cst2 comprises the source electrode S of the second switch TFT ST2 and the first common line VCL1 overlapping with the source electrode S of the second switch TFT ST2 with a dielectric layer interposed therebetween. The dielectric layer of the second storage capacitor Cst2 comprises a gate insulation film GI, a semiconductor active layer ACT, and a semiconductor ohmic contact layer N+ which are sequentially laminated.

The discharge control TFT DST switches a current path between the second pixel electrode Ep2 and the second common line VCL2 in response to the discharge control voltage V3D. The gate electrode of the discharge control TFT DST is connected to the discharge control line V3DL, and the source electrode S thereof is connected to the source electrode S of the second switch TFT ST2. The source and drain electrodes S and D of the discharge control TFT DST overlap with the discharge control line V3DL formed I parallel with the gate line GL with the semiconductor pattern ACT and N+ interposed therebetween. Part of the discharge control line V3DL is used as the gate electrode of the discharge control TFT DST. The source electrode S of the discharge control TFT DST and the source electrode S of the second switch source electrode S are connected through a source/drain metal pattern formed on the pattern of the semiconductor active layer ACT and the semiconductor ohmic layer N+ and extending across the gate line GL. The drain electrode D of the discharge control TFT DST is connected to the second common line VCL2 through a fourth contact hole CH4 passing through the organic insulation film PAC.

As shown in FIGS. 7 to 8C, the gate line GL, the discharge control line V3DL, and the first common line VCL1 may be formed in a gate metal pattern formed on the glass substrate SUB. The source and drain electrodes S and D of the TFTs ST1, ST2, and DST may be formed in a source/drain metal pattern which is formed on the semiconductor pattern ACT and N+ and formed integrally with the semiconductor pattern ACT and N+. As shown in FIGS. 7 and 8C, the pixel electrodes Ep1 and Ep2, the common electrodes Ec1 and Ec2, and the second common line VCL2 may be formed in a transparent electrode pattern formed on the organic insulation film PAC.

A data voltage charged in the liquid crystal cells Clc1 and Clc2 is varied by as much as a kickback voltage ΔVp. The kickback voltage ΔVp is defined as a value which varies depending on the parasitic capacitance of the pixel PIX as in the following Equation 1:

$$\Delta Vp = \frac{Cgs}{Clc + Cst + Cgs} \times \Delta Vg$$

where Cgs means the gate-source parasitic capacitance of the TFTS ST1, ST2, and DST, Clc means the capacitance of the liquid crystal cells Clc1 and Clc2, Cst means the capacitance of the storage capacitors Cst1 and Cst2, and ΔVg means the difference between the gate high voltage VGH and the gate low voltage VGL.

In FIG. 6, Cgs1 is the gate-source parasitic capacitance of the first switch TFT ST1, and Cgs2 is the gate-source parasitic capacitance of the second switch TFT ST2. As can be seen from FIGS. 7 to 8C, Cgs1 is formed at an overlapping portion of the gate line GL and the source electrode S present in the first switch TFT ST1, and hence the capacitance thereof is relatively small. Cgs2 is larger than Cgs1 because it comprises an overlapping portion of the gate line GL and the source electrode S present in the second switch TFT ST2, an overlapping portion of the second pixel electrode Ep2 connected to the source electrode S of the second switch TFT ST2 and the gate line GL, and an overlapping portion of the source electrodes S of the second switch TFT ST2 and discharge control TFT DST connected to each other in a source/drain metal pattern and the gate line GL. In this case, as can be seen from Equation 1, ΔVp of the auxiliary display section SP is larger than ΔVp of the main display section MP, and therefore the brightness of the main display section MP and the brightness of the auxiliary display section SP are different at the same gray scale. Since the capacitance of the overlapping portion of the source electrodes S of the second switch TFT ST2 and discharge control TFT DST connected to each other in the source/drain metal pattern and the gate line GL is large, Cgs2 is larger than Cgs1. Meanwhile, the capacitance of the overlapping portion of the gate line GL and the source electrode S present in the second switch TFT ST2 is much smaller than that of other CGs2 components because the thickness of the dielectric layer is thick as shown in FIG. 8A.

To compensate for the difference in kickback voltage ΔVp between the main display section MP and the auxiliary display section SP to adjust their kickback voltage to an equal level, the capacitance of the storage capacitor Cst in Equation 1 can be adjusted. For example, in the structure of FIGS. 7 to 8C, Cgs2 is larger than Cgs1, and hence ΔVp of the auxiliary display section SP is larger than ΔVp of the main display section SP. Accordingly, as can be seen from Equation 1, if the capacitance of the storage capacitor Cst2 of the auxiliary display section SP is increased, ΔVp of the auxiliary display section SP is lowered, thus adjusting ΔVp of the main display section MP and the auxiliary display section SP to an equal level. However, this method results in a decrease in the aperture ratio of the pixel PIX because the capacitance of the storage capacitor Cst2 of the auxiliary display section SP should be more than 2 times larger than the capacitance of the storage capacitor Cst1 of the main display section MP as shown in FIG. 7.

Figure 9:
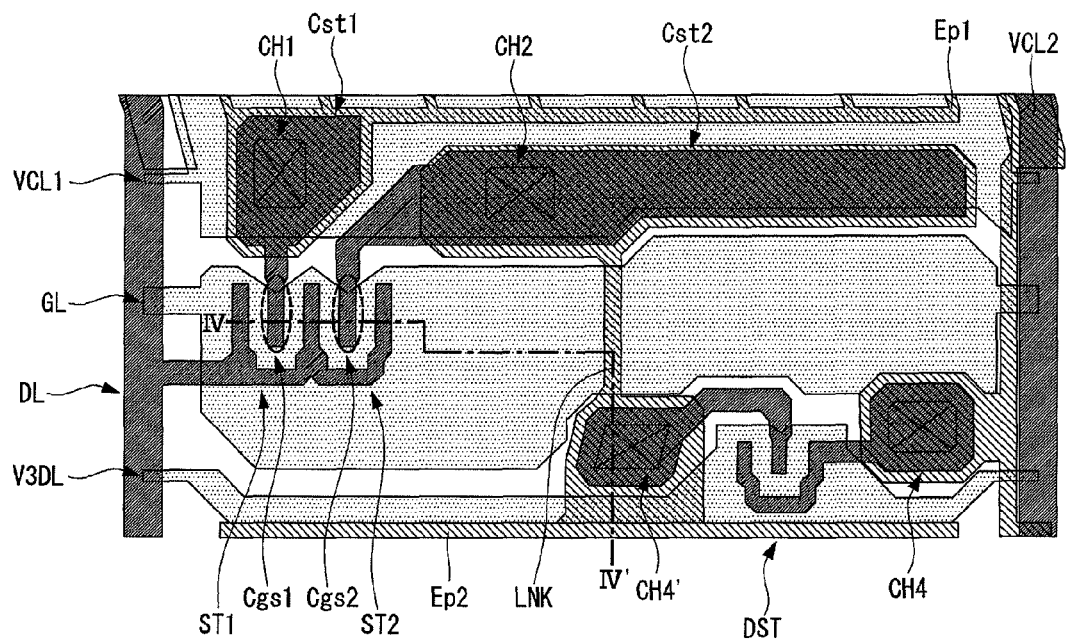
FIG. 9 is a top plan view showing in detail a pixel according to an exemplary embodiment of the present invention.
Figure 10:
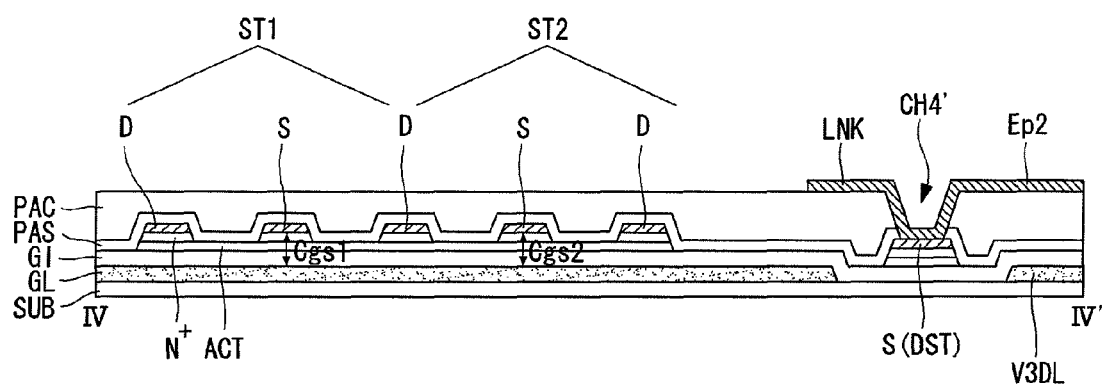
FIG. 10 is a cross-sectional view showing a cross-section taken along line IV-IV' of FIG. 9.

To achieve ΔVp of the main display section MP and the auxiliary display section SP at an equal level without decreasing the aperture ratio of the pixel PIX, the present invention suggests a method of lowering Cgs2 in the structure shown in FIGS. 9 and 10.

FIG. 9 is a top plan view showing in detail a pixel according to an exemplary embodiment of the present invention. FIG. 10 is a cross-sectional view showing a cross-section taken along line IV-IV' of FIG. 9.

Referring to FIGS. 9 and 10, the source electrode S of the second switch TFT ST2 is connected to a link pattern LNK through a second contact hole CH2 passing through the organic insulation film PAC and the inorganic insulation film PAS.

The link pattern LNK is commonly connected to the source electrode S of the discharge control TFT DST and the second pixel electrode Ep2 through a fourth contact hole CH4' passing through the organic insulation film PAC and the inorganic insulation film PAS. The link pattern LNK and the second pixel electrode Ep2 are simultaneously formed in the same transparent electrode pattern on the organic insulation film PAC. The link pattern LNK allows the source electrode S of the second switch TFT ST2 to be connected to the source electrode S of the discharge control TFT DST and the second pixel electrode Ep2 at the shortest distance. As shown in FIG. 9, the source electrode S of the discharge control TFT DST is bent leftward from the semiconductor channel ACT and N+ within the U-shaped drain electrode D. In this case, the shortest distance between the source electrode S of the second switch TFT DST and the source electrode S of the TFT DST is a vertical path.

As the overlapping portion of the source electrodes S of the second switch TFT ST2 and discharge control TFT DST and the gate line GL which are shown in FIGS. 7 and 8A is removed, Cgs2 can be dropped to the same level as Cgs1. Accordingly, the present invention can achieve ΔVp of the main display section MP and auxiliary display section SP at an equal level without an increase of the aperture ratio to increase the capacitance of the second storage capacitor Cst2. Moreover, the present invention can improve the data voltage charging and maintenance characteristics of the auxiliary display section SP to the level of the main display section SP because a drop in Cgs2 causes a drop in ΔVp of the auxiliary display section SP.

Figure 11:
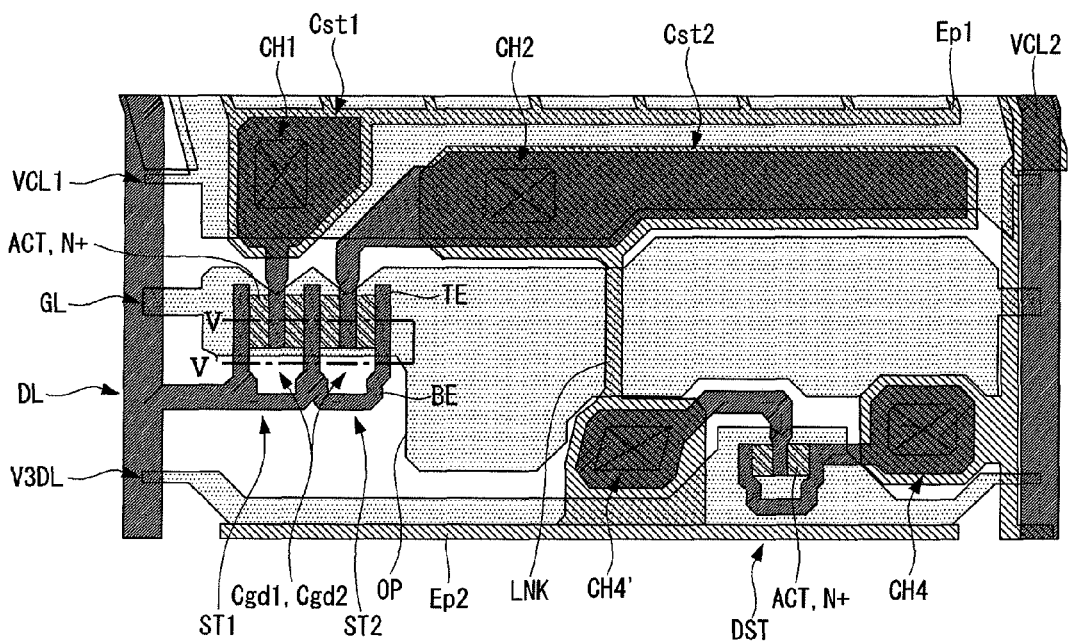
FIG. 11 is a top plan view showing in detail a pixel according to another exemplary embodiment of the present invention.
Figure 12:
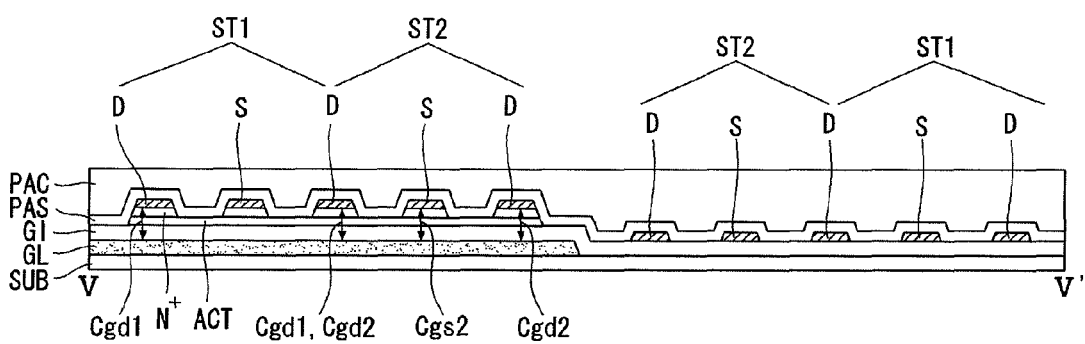
FIG. 12 is a cross-sectional view showing a cross-section taken along line V-V' of FIG. 11.

FIG. 11 is a top plan view showing in detail a pixel according to another exemplary embodiment of the present invention. FIG. 12 is a cross-sectional view showing a cross-section taken along line V-V' of FIG. 11.

With reference to FIGS. 11 and 12, the semiconductor pattern ACT and N+ may be formed at part of the channel between the source electrode S and the drain electrode D in the TFTs ST1, ST2, and DST.

In the present invention, to decrease Cgd1 and Cgd2, part of the gate line GL overlapping with the drain electrodes D of the first and second switch TFTs ST1 and ST2 is further removed. Due to the portion OP removed by patterning the gate line GL in a reverse L-shape, the bottom end portions of the drain electrodes D of the first and second switch TFTs ST1 and ST2 do not overlap with the gate line GL, i.e., the gate electrodes. Here, the bottom end portions of the drain electrodes D of the first and second switch TFTs ST1 and ST2 correspond to the bottom ends of W-shaped channels of the first and second switch TFTs ST1 and ST2, are positioned under the source electrodes S of the first and second switch TFTs ST1 and ST2, and have no semiconductor pattern ACT and N+. Accordingly, the gate line GL overlaps with the top ends TE of the drain electrodes of the first and second switch TFTs and the bottom ends BE of the source electrodes S thereof. On the other hand, the gate line GL does not overlap with the bottom ends BE of the drain electrodes D of the first and second switches TFTs ST1 and ST2, and also does not overlap with the top ends TE of the source electrodes S of the first and second switches TFTs ST1 and ST2. The present invention can improve the data voltage charging characteristics of the pixel PIX because the delay time of a data voltage charged in the pixel PIX is reduced by lowering Cgd1 and CGd2 using the structure shown in FIGS. 11 and 12.

As described above, in the stereoscopic image display according to the present invention, the source electrode of the second switch TFT is connected to a link pattern, which is a transparent electrode pattern, and the link pattern is commonly connected to the source electrode of the discharge control TFT and the pixel electrode of the second liquid crystal cell. Accordingly, the present invention can adjust the kickback voltages ΔVp of the main display section and auxiliary display section to an equal level and improve the data voltage charging and maintenance characteristics of the auxiliary display section without a decrease in aperture ratio by lowering Cgs of the auxiliary display section.

Moreover, the present invention can further improve the data voltage charging characteristics of the main display section and the auxiliary display section because the data delay of the main display section and the auxiliary display section is reduced by removing part of the gate line under the drain electrodes of the first and second switch TFTs.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display comprising:
a main display section comprising a first liquid crystal cell connected to a data line through a first switch TFT and connected to a common line supplied with a common voltage and a first storage capacitor; and
an auxiliary display section comprising a second liquid crystal cell connected to the data line through a second switch TFT and connected to the common line through a discharge control TFT and a second storage capacitor,
wherein the main display section and the auxiliary display section are separated within a pixel, with a gate line crossing the data line interposed therebetween,
a source electrode of the second switch TFT is connected to a link pattern through a first contact hole passing through a passivation film,
the link pattern is commonly connected to a source electrode of the discharge control TFT and a pixel electrode of the second liquid crystal cell through a second contact hole passing through the passivation film, and
the link pattern allows the source electrode of the second switch TFT to be connected to the discharge control TFT and the pixel electrode of the second liquid crystal cell at a shortest distance for maintaining kickback voltages of the main display section and the auxiliary display section at an equal level.

2. The stereoscopic image display of claim 1, wherein the link pattern and the pixel electrode of the second liquid crystal cell are in a transparent electrode pattern formed on the passivation film covering the TFTs.

3. The stereoscopic image display of claim 1, wherein the common line comprises a first common line which is parallel with the gate line, and a second common line which is parallel with the data line, and the first common line is connected to the second common line through a third contact hole.

4. The stereoscopic image display of claim 3, wherein the first common line is connected to the first storage capacitor and the second common line is connected to the auxiliary display section through the discharge control TFT.

5. The stereoscopic image display of claim 3, wherein the first storage capacitor comprises a source electrode of the first switch and parts of first common line overlapping with the source electrode of the first switch with a first dielectric layer interposed therebetween, the second storage capacitor comprises the source electrode of the second switch TFT and another parts of the first common line overlapping with the source electrode of the second switch TFT with a second dielectric layer interposed therebetween.

6. The stereoscopic image display of claim 5, wherein each of the first dielectric layer and the second dielectric layer comprises a gate insulation film and a semiconductor pattern, and the semiconductor pattern comprises a semiconductor active layer and a semiconductor ohmic contact layer formed thereon.

7. The stereoscopic image display of claim 6, wherein the gate line and the semiconductor pattern are partially overlapped with drain electrodes of the first and second switch TFTs.

8. The stereoscopic image display of claim 7, wherein the gate line overlaps with the top ends of the drain electrodes of the first and second switch TFTs and the bottom ends of the source electrodes of the first and second switch TFTs, and the gate line does not overlap with the bottom ends of the drain electrodes of the first and second switches TFTs, and also does not overlap with the top ends of the source electrodes of the first and second switches TFTs.

9. The stereoscopic image display of claim 1, a gate electrode of the first switch TFT and a gate electrode of the second switch TFT is connected to the gate line.

10. The stereoscopic image display of claim 1, further comprising a discharge control line for supplying a discharge control voltage to switch the discharge control TFT, and the discharge control line being connected to the gate electrodes of the discharge control TFT.

11. The stereoscopic image display of claim 1, wherein a drain electrode of the first switch TFT and second switch TFT are connected to the data line, a drain electrode of the discharge control TFT is connected to the common line.

12. The stereoscopic image display of claim 11, wherein the drain electrodes of the first and second switch TFTs are integrally formed in a 'W'-shaped in which two U shapes are connected in parallel, and the drain electrode of the discharge control TFT is patterned in 'U' shape.

13. The stereoscopic image display of claim 1, wherein a portion of the link pattern overlapped on the gate line is parallel with the data line.

14. The stereoscopic image display of claim 1, wherein the link pattern allows the source electrode of the second switch TFT to be connected to the source electrode of the discharge control TFT and the second pixel electrode at a shortest distance.

* * * * *